Aug. 5, 1969

R. H. LOGAN 3,460,140

CONOPULSE RADAR

Filed June 29, 1967

INVENTOR
RUSSELL H. LOGAN

ATTORNEY

*INVENTOR*
RUSSELL H. LOGAN

*ATTORNEY*

United States Patent Office 3,460,140
Patented Aug. 5, 1969

3,460,140
CONOPULSE RADAR
Russell H. Logan, Irving, Tex., assignor to Texas Instruments Incorporated, Dallas, Tex., a corporation of Delaware
Filed June 29, 1967, Ser. No. 649,915
Int. Cl. G01s 9/40
U.S. Cl. 343—16                                     10 Claims

ABSTRACT OF THE DISCLOSURE

Single beam radar employing within-pulse-scanning determines target range and angle. The phases of the signals transmitted from antenna elements are controlled individually by means of a beam steering control unit thereby determining the beam pointing direction. The relative phases of the signals from elements in an array are further controlled by mixing a scan signal with the transmit oscillator signal so that within each transmitted pulse the antenna beam scans a trajectory about the normal beam pointing direction. After reflection from a target, angle and range controlled parameters of the return signal are extracted.

---

This invention relates to a radar in which scanning is accomplished within each transmitted pulse. Preferably the scanning is conical in time and space.

A tracking radar system measures the coordinates of a target and provides data which may be used to determine the target path and to predict its future position. Tracking radar systems may be roughly classified as sequential lobing or simultaneous lobing. The information available from a tracking radar system is usually presented on a cathode-ray-tube display for observation by an operator, and may also be supplied to a system which indicates the target path, speed, and its probable future position.

Sequential lobing radar systems, which include conical scanning radar systems, directs a pulsed antenna beam about a target in a sequential pulse pattern. Each pulse returning from the target yields range data. However, at least three pulses are required to obtain the angular position in a two-dimensional system.

An extension of the sequential lobing radar systems is the conical scan radar system which continuously rotates an offset antenna beam. This is in contrast with discontinuously stepping a radar beam between three or four discrete positions as in the sequential lobing radar. In a conical scan radar system, the echo signal is employed to generate an error signal for a servo control system which causes the beam to rotate and continually position the antenna on the target.

Simultaneous lobing radar systems use monopulse techniques to process several beam lobes simultaneously to yield both range and angle data from each echo pulse. More than one antenna beam is used simultaneously in these systems, in contrast to the conical scan or sequential lobing systems where one antenna beam is employed on a time-shared basis. In both the sequential lobing and conical scan tracking systems, the measurement of angular error in two orthogonal coordinates requires transmission and reception of several pulses. In the time interval during which a measurement is made with either of the latter systems, angular accuracy is degraded if the series of echo pulses contain amplitude-modulation components other than the modulation produced by scanning. If the echo pulse train contains additional modulation components caused, for example, by a fluctuating target cross section, tracking accuracy may suffer, especially if the frequency components of the fluctuations are near or at the conical-scan frequency or the sequential lobing rate. Errors thus arise in control of servos in antenna-pointing control loops.

Simultaneous lobing monopulse radar systems avoid the errors from the relatively low-frequency target amplitude fluctuations because the angular information from each pulse is determined by means of a phase and/or amplitude comparison of the several lobes. Pulse-to-pulse amplitude fluctuations of the echo signal have no effect on tracking accuracy if the angular determination is made on the basis of one pulse from two or more beams rather than many pulses from one beam. Although simultaneous lobing monopulse systems offer greater accuracy, they require a multiple receiver channel for echo lobe processing.

In accordance with this invention, the reliability and flexibility inherent in a radar system having meam steering capability are retained while obtaining the benefits derived from the sequential lobing and simultaneous lobing systems.

More particularly, in one aspect, a helical shaped pulse is transmitted during each radar transmitting period of a radar having provision for steering the beam pointing direction through the use of phase modulation, to establish a conical pulse in time and space. The amplitude and phase of the signal transmitted from each element is controlled individually in order to obtain a desired beam pattern and angle. Where the antenna is an extensive array of radiators, in addition to controlling the elements on an individual basis, they are also controlled in sections by varying the phase of the transmit oscillator signal so that the beam angle is modified to follow a conical trajectory. The return pulse is then employed to extract range and angle of the target.

A more complete understanding of the invention and its advantages will be apparent from the specification and claims and from the accompanying drawings illustrative of the invention.

The invention will first be described in terms of a land based or airborne tracking and navigation radar employing as a radiator hundreds of elements in a complex phased array and excited to produce a conical scan during each transmitted pulse. It will then be shown that the invention may be employed with less complex radiators, so long as they have beam pointing capability, for operation in two or three dimensions.

Figure 1:
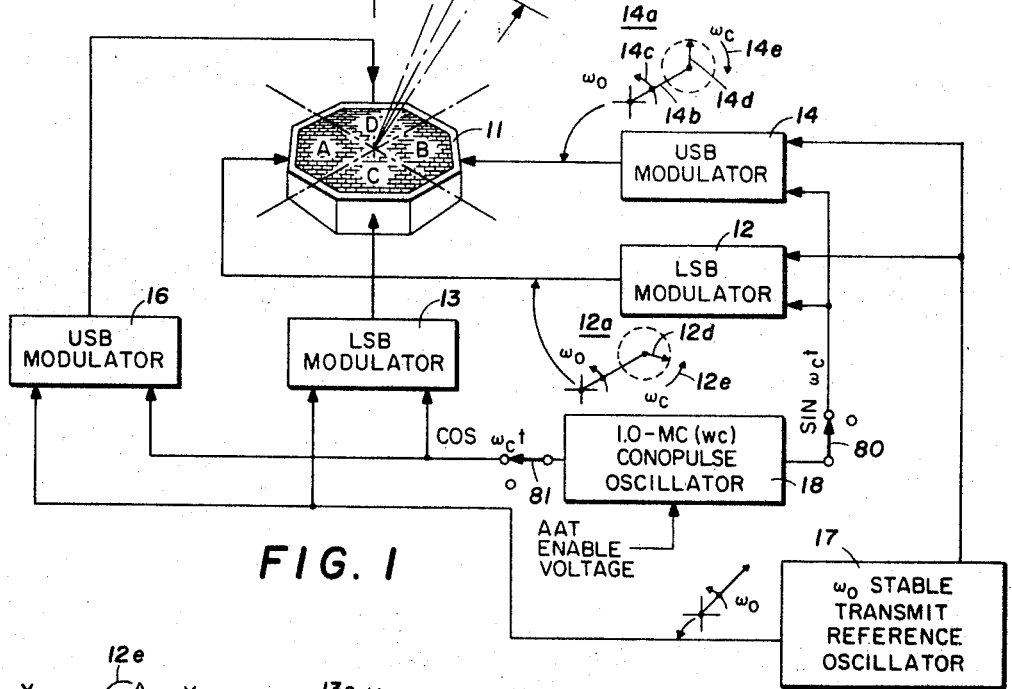
FIGURE 1 is a simplified block diagram of a beam shaping circuit.

Referring to FIGURE 1, there is shown an antenna 11 consisting of a planar array of radiating elements. Such an array, generally well known, may be comprised of hundreds of individual radiation elements or antennae to form the single array. As disclosed in U.S. Patent No. 3,238,528, the elements of antenna 11 are controlled individually to shape and direct the beam 11a. In accordance with one aspect of this invention, the array is also controlled by quadrants A, B, C, and D, one set of arbitrary quadrant boundaries being shown in FIGURE 1.

In this system a beam is produced which, during each pulse, follows a pattern $11b$ which is conical in time and space. More particularly, a lower side band modulator 12 is connected to quadrant A to generate a phase-modulated radio frequency signal. One input of modulator 12 is connected to the output of a transmit reference oscillator 17. The other input is connected to a sin $\omega t$ or in-phase output of a conopulse oscillator 18. Similarly, a lower side band modulator 13 applies a phase modulation to the radio frequency signal to the elements located in quadrant C of the antenna 11. An upper side band modulator 14 is connected to quadrant B. An upper side band modulator 16 is connected to quadrant D. The phase modulated RF signals are to be applied to the elements of array 11 in the respective quadrants. The transmit reference oscillator 17 is connected to one input of each of the modulators 12, 13, 14 and 16. Oscillator 17 provides the high frequency output that is to be phase modulated by modulators 12, 13, 14 and 16. The conopulse oscillator 18 is connected to the modulators 12, 13, 14 and 16. It supplies a sin $\omega t$ or in-phase output to modulators 12 and 14 and a cos $\omega t$ or quadrature-phase output to modulators 13 and 16.

Figure 2:
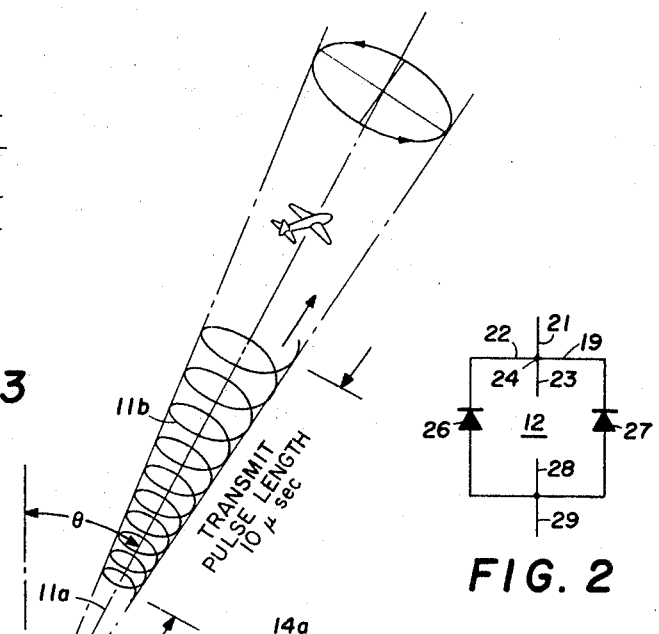
FIGURE 2 is a block diagram of the control system for one radiating element.

FIGURE 2 illustrates a modulator circuit 12 which utilizes a hybrid junction such as a magic T or its equivalent. Modulators 13, 14 and 16 may be of the same construction. Modulator 12 may consist of four arms 19, 21, 22 and 23 having a junction point 24. The oscillator 18 is connected to the arm 21. The signal from oscillator 18 is divided equally between the arms 19 and 22. The reference oscillator 17 is connected to the arm 23. Its signal also is divided equally between the arms 19 and 22. In modulator 12 none of the energy from the pulse oscillator 18 enters the arm 23 and none of the energy from the reference oscillator 17 enters the arm 21. A Schottky barrier mixer diode 26 or equivalent functional non-linear device is connected in the arm 22 and a similar diode 27 is connected in the arm 19. Diodes 26 and 27 are positioned at equal distances from the junction point 24. An open-ended quarter wavelength stub 28 connects to diodes 26 and 27 and to the output line 29.

In operation, the oscillator 18 signal is divided equally between lines 19 and 22. The signal in one arm 19 is 180° out of phase with the signal in the arm 22. The signal from the reference oscillator 17 is also divided equally between lines 19 and 22 but both these signals are in phase. The result being that at one of the modulator diodes the two signals are in phase and in the other they are 180° out of phase. The open-ended quarter wavelength stub 29 serves to limit the output frequency of the modulator to the difference between the frequencies of the pulse oscillator, 18, and the reference oscillator, 17.

In FIGURE 1 the output of the conopulse oscillator 18, as applied to the modulators 12 and 14, is 90° out of phase with the output connected to the modulators 13 and 16. The output of the modulators 12 and 14 is shown vectorially in FIGURE 1 by plots $12a$ and $14a$. Vector $14b$ represents the output of oscillator 17 rotating in the direction of arrow $14c$. The signal from conopulse oscillator 18 is represented by vector $14d$ rotating in the direction of arrow $14e$. The same phase relations exist in plot $12a$ except that conopulse vector $12d$ rotates in the opposite direction as indicated by arrow $12e$.

Figure 5:
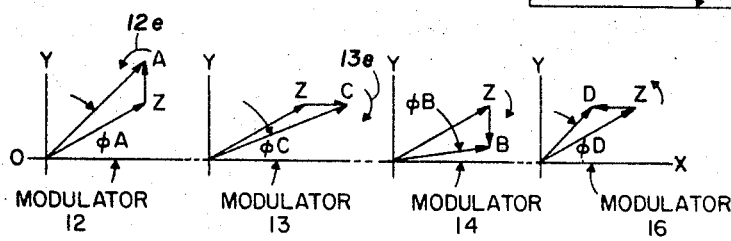
FIGURE 5 illustrates combining altering modulation signals.

FIGURE 5 illustrates vector representations of the output signal from all of the four modulators 12, 13, 14 and 16. In each of the four plots the vector OZ represents the output of the transmit oscillator 17 at a given instant of time. The output of each modulator will be dependent upon OZ and the position of the vector representing the output from the conopulse oscillator 18. For the modulator 12, the vector ZA rotating in the direction of arrow $12e$ represents the output of the conopulse oscillator 18 connected to the modulator 12. The resultant vector OA represents the signal connected to quadrant A of the array antenna 11. The phase of the signal connected to all the radiating elements in quadrant A is the angle $\phi A$ between the vector Oa and the reference axis $x$. For modulator 13, the vector ZC rotating in the direction of the arrow $13e$ represents the output of the conopulse oscillator 18 connected to the modulator 13. The resultant vector OC represents the signal connected to quadrant C of the array antenna 11. The phase of the signal connected to quadrant C is the angle $\phi C$ between the vector OC and the reference axis $x$. Similarly, the signal connected to quadrant B of the array antenna 11 is represented by the vector OB and the phase of this signal is the angle $\phi B$ between vector OB and the reference axis $x$. The signal connected to quadrant D of the array antenna 11 is represented by the vector OD and the phase of this signal is the angle between the vector OD and the reference axis $x$. Note, that the vector ZC is 90° out of phase with the vector ZA, the vector ZB is 180° out of phase with the vector ZA, and that the vector ZD is 180° out of phase with the vector ZC. Thus, as a result of mixing the reference oscillator signal with the conopulse oscillator signal, the phase of the signal connected to the radiating elements in each quadrant of the array antenna 11 is different from the phase of any other quadrant. As a result, the beam follows a spiral trajectory to form a conical pulse.

Figure 4:
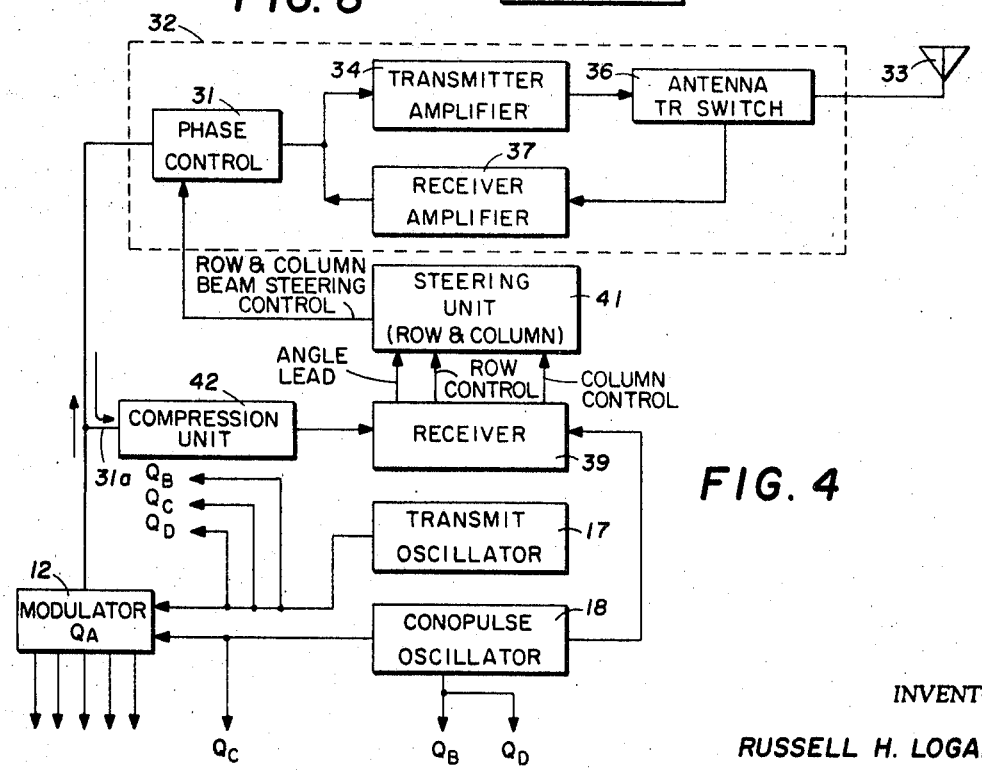
FIGURE 4 is a schematic of a phase controlling circuit.

As shown in FIGURE 4, the signals from the transmit oscillator 17 and the conopulse oscillator 18 are combined in the modulator 12. The output of the modulator 12 is connected to a phase control circuit 31 in a control module 32 which module controls radiating element 33. When the radiating element 33 is in the transmit mode, the signal from the phase controller 31 is amplified in the transmitter amplifier 34 and applied to the radiating element 33 by means of a TR switch 36. In the receiving mode, the radiating element 33 senses the signal which is transmitted to a receiver amplifier 37 through the TR switch 36. The return signal then passes through the phase control circuit 31 to a receiver 39. The receiver 39 compares the phase of the return signal with the phase of the signal generated by the pulse oscillator 18. From this operation three signals are generated and applied to a steering unit 41 for controlling the phases of the signal transmitted from the individual elements in the array including radiating element 33. The operation of the receiver 39 in conjunction with the steering unit 41 to control the phase of the individual radiating elements is described in U.S. Patent No. 3,238,528. A preferred system is disclosed in copending application Ser. No. 397,491, now abandoned, entitled Integrated Circuit Modular Radar Antenna, filed on behalf of Tom M. Hyltin et al., and assigned to the assignee of the present invention.

Figure 3:
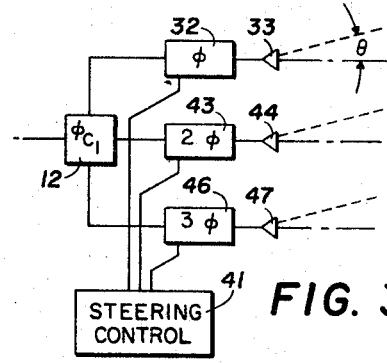
FIGURE 3 is a schematic of three radiating elements.

In FIGURE 3, the module 32 connects the radiating element 33 to the modulator 12. Also connected to the modulator 12 is a control module 43 for a second radiating element 44 and a control module 46 for a third radiating element 47. The control modules 32, 43 and 46 are also connected to the steering control unit 41. The radiating elements 33, 44 and 47 are all located in quadrant B of the array antenna 11. For all the elements in the other three quadrants, a similar system is provided between the steering unit 41 and the respective modulators. All the elements in all four quadrants are connected to the steering unit 41 and the phase of the signal transmitted from each individual element, with reference to all other elements, is controlled by the steering unit 41, as described in U.S. Patent No. 3,238,528.

In a phased array antenna 11 having a great many elements, such elements preferably are equally spaced with respect to each other. If a signal of the same phase is applied to all the elements, the position of the main beam will be broadside to the array at an angle $\theta=0$, FIGURE 1. In FIGURE 3, the beam from each element would then be along the axis of the antenna. If the phase of the signal from the element 33 is equal to $\phi$, and the phase of the signal from the element 44 is equal to $2\phi$, and the phase of the signal at the element 47 is equal to $3\phi$, as established by the steering unit 41, the main beam from the antenna 11 will be in a direction dependent upon the phase angles. The phase relationship between any one element and all other elements in the array antenna 11 is the vector sum of the phase established by the steering unit 41 and the phase established by the modulators 12, 13, 14 and 16. For the three elements shown in FIGURE 3, the total phase of the signal from each element is equal to $\phi c+\phi$, where $\phi c$ is a phase established by the modulator 12 and $\phi$ is a phase of the individual elements as established by the steering unit 41.

Figure 6:
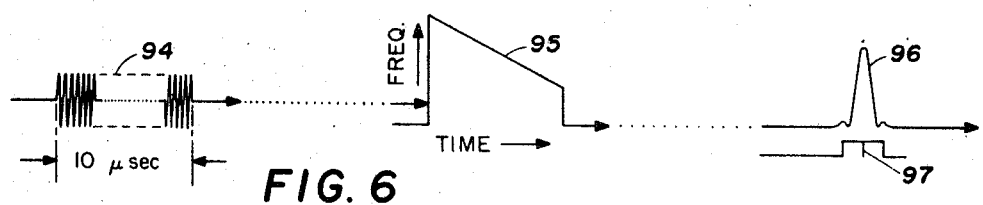
FIGURE 6 illustrates received signals for a centered target.

A return signal received by one of the elements of the array antenna 11 is shown in FIGURE 6. Frequency processing in the form of pulse compression is a known procedure in operating a tracking radar system and is illustrated herein to operate on the pulse. Pulse compression is employed in radar where transmitted pulses are long in order to obtain a resolution and accuracy of a short pulse while retaining the high power of a long pulse. A frequency processing receiver, a compression unit 42, leading to receiver 39, FIGURE 4, operates on the modulation of the received pulse 94 to compress the pulse to a much shorter one. FIGURE 6 shows both the received pulse 94 and the compressed pulse 96. The received signal, as well as the transmitted pulse, has a time frequency characteristic 95. In accordance with pulse compression techniques, the received pulse is passed through compression unit 42 which consists essentially of a filter which delays high frequencies more than low frequencies. As a result, the various frequency components are stacked one on top of the other in time, resulting in the compressed pulse 96. The pulse is compressed to lie within the time gate 97. By way of example, the received pulse 94 of 10 microseconds duration may be compressed into a 0.1 microsecond gate 97.

Figure 7:
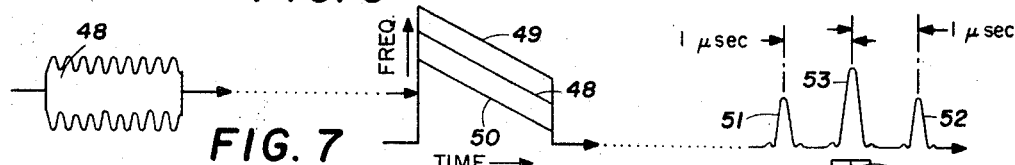
FIGURE 7 illustrates received signals with a target off the center of the beam.

If the target is not in the center of the conical beam, the received signal will be amplitude modulated. Modulation results in side bands spaced above and below the frequency, $f_o$. Such a return signal envelope 48 is shown in FIGURE 7 with both the upper and lower side bands 49 and 50 related to the center frequency 48′. Side bands 49 and 50 cause early and late signals 51 and 52, respectively, to appear in the compressed wave 53 shown in FIGURE 7. The phase of the lower side band in the early compressed pulse 51 contains information relative to the target angle, i.e., the angle between the target and the center of the helical beam.

Figure 8:
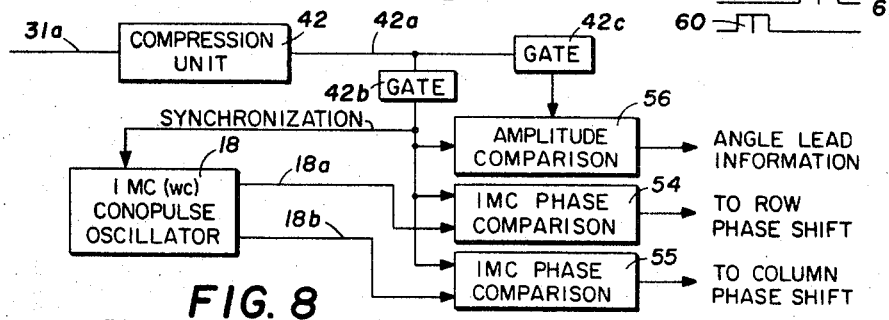
FIGURE 8 illustrates operation upon the return signal of FIGURE 7.

FIGURE 8 illustrates in greater detail the receiver 39 of FIGURE 4. In FIGURE 8 the conopulse oscillator 18 is connected by channel 18a to a phase comparison unit 54 and by way of channel 18b to a phase comparison unit 55. The pulse compression unit 42 has channel 31a leading thereto by means of which the received signal is applied to the pulse compressor 42. The compressed output signal containing pulses 51–53 of FIGURE 7 is applied by way of channel 42a to a gate 42b. The gate 42b passes that portion of the compressed pulse from unit 42 to each of three comparison circuits 54, 55 and 56 for the duration of the time gate 60. The gate 42c passes that portion of the compressed pulse lying within time gate 61 to the amplitude comparison unit 56 only. The outputs of the comparison circuits 54–56 are applied to the steering unit 41 as indicated in FIGURE 4. Thus, the phase of the lower side band signal is compared with the two quadrature phase outputs from the pulse oscillator 18 by means of the phase comparison circuits 54 and 55, respectively. The output signal from the phase comparison circuit 54 is representative of a phase shift by rows of elements in the antenna array 11 that is necessary to center the target in the beam. The output signal from the phase comparison circuit 55 is representative of the column phase shift of the elements of the antenna 11.

By amplitude comparison of the center pulse of compressed pulse 53, FIGURE 7, with the lower side band pulse 51 in a comparison circuit 56, an angular lead signal is produced. The output of the amplitude comparison circuit 56 is connected to the steering unit 41 where it is utilized, like lead signals produced in prior systems, for improving the tracking accuracy.

Thus for a target directly in the center of the conopulse beam, there is uniform illumination during the transmitted expanded pulse interval. As a result, only one receive or chirp frequency component $f_o$ is present as indicated in FIGURE 6. Such a return signal when compressed is characterized by a single pulse 46, FIGURE 6, which will be present in the readout operation of the target video signal.

As above noted, if the target is not in the center of the conopulse beam, the received amplitude envelope will be amplitude modulated at a prescribed frequency corresponding with the frequency of conopulse oscillator 18. Where the conopulse oscillator has a frequency of 1 megacycle, then the upper and lower side bands will be spaced $\pm 1$ megacycle from the normal frequency $f_o$. As indicated in FIGURE 7 where the received pulse gate length is 10 microseconds, there are 10 cycles of amplitude modulation on the received pulse 48. Because of this modulation, the signal at the output of the pulse compressor 42 includes, along with the center pulse 53, the lower and upper side band pulses 52 and 51, FIGURE 7. By establishing the early gate 60 centered on the lower side band pulse 51 the first range readout signal from the lower side band is produced. The phase of the conogated signal is indicative of the angle between the center of the conopulse beam and the target. Thus the phase comparison in units 54 and 55 between pulse 51 and the outputs of the conopulse oscillator 18 will produce signals at the outputs of units 54 and 55, respectively, representative of row and column phase shifts necessary for centering the beam on the target.

By comparing the amplitudes of the pulses 51 and 53 which appear in gates 60 and 61, the angle lead is determined for aiding in tracking the target.

The location of the pulse 53 in the return signal is carried out in accordance with well-known procedures which are generally designated as early gate-late gate tracking, as described in introduction to Radar Systems, Skolnik, McGraw-Hill, 1962, pages 189, 190. Further, where the conopulse oscillator 18 employs a 1.0 megacycle output, the lower side band pulse 51 of FIGURE 7 will always be centered one microsecond earlier than the center of compressed pulse 53. Thus the gates 42b and 42c will be controlled in accordance with the known early gate-late gate tracking radar techniques with the time relations indicated in FIGURE 7.

While the foregoing description has been based upon the operation of a phased array antenna having a great number of radiating elements, it will be appreciated that a conical pulse may be generated and utilized by a system in which the relative phases of excitation pulses are controlled for application to only three or four radiating elements mounted in spaced-apart relation within a given reflector which may be positionally adjusted to control the normal beam pointing direction. In such case, as well as in the operation of a phased array antenna composed of many radiating elements, a conical pulse is produced. Such a pulse is readily distinguishable from pulses employed in conical scan operations wherein a reflector is rotated and a pulse is radiated at each of a plurality of antenna positions such that a cone is scanned only by use of a plurality of pulses. In accordance with the present invention, the phase of the signals applied to the antenna elements are so controlled by the conopulse generator that each pulse radiated from the antenna follows a conical path. Because of the characteristics of the phased array radar, the present invention is particularly adaptable thereto but it should be understood that it is not limited to a phased array radar of the type shown in FIGURE 1. More particularly, only three dipoles or three horns may be employed. In such case they will be excited by pulses that are 120° out of phase. Alternatively, a single radiator may be employed in place of each of the multielement sectors A–D of FIGURE 1 and each may be excited as in FIGURE 1 for scanning during each transmitted pulse.

In FIGURE 1, two switches 80 and 81 are provided in the channels leading from oscillator 18. It will now be seen that if one of the two switches is opened the scanning accomplished within each pulse will be limited to two dimensions. One scan direction will be selected by opening switch 80 with switch 81 closed and an orthogonal direction will be selected with switch 80 closed and switch 81 open.

Thus, while the invention is above referred to as a conopulse operation which implies a three dimensional scan, the within pulse scan operation of the invention is not limited to three dimensions but may be employed in two dimensions. The preferred mode of operation in any case involves changing the beam direction during the transmitted pulse and extracting target position information from the return signal.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a radar system having radiating elements and a first control means for individually establishing the phase of the pulses transmitted from each element of said antenna to steer the antenna beam, the combination which comprises:
   (a) a second control means for modifying the phase of the pulses established by said control means within the time duration of each pulse for steering the antenna beam in a predetermined repeated trajectory during each pulse for production of return signals from targets which when off the center of said beam are amplitude modulated, and
   (b) receiver means connected to said second control means and to said elements for utilizing the return signal for producing a signal dependent upon said modulation which is representative of the relation between the beam center and the target location.

2. The combination set forth in claim 1 wherein said elements are at least two in number and wherein means are provided for modifying the phase of the signals on said elements through a plurality of cycles in the period of each transmitting signal.

3. The combination set forth in claim 1 wherein said elements are at least three in number and means are provided for applying said pulses thereto to produce a conical trajectory of said beam.

4. The combination set forth in claim 1 wherein a pulse compressor produces a center frequency pulse and upper and lower side band pulses for an off center target return and wherein amplitude comparison means are provided for comparing the amplitude of the center frequency pulse on the lower side band pulse to indicate the angle lead of the target from beam center.

5. The combination set forth in claim 1 wherein a pulse compression unit is provided for the return signal and wherein the output of the pulse compression unit passes through a phase comparator connected to said second control means for determining the target angle relative to the center of the conopulse beam.

6. A radar beam control system for an array antenna formed by a plurality of radiating elements energized by pulsed energy from a transmit reference oscillator where steering control means establish at each element a predetermined phase relation in the signal transmitted from said element relative to the phase of the signal transmitted by the other of said elements, the combination which comprises means for modifying the phase of the signal from said oscillator by sections of said array during each transmitted pulse for directing said beam in a conical path.

7. A radar beam control system as set forth in claim 6 wherein a modulator is connected at one input to the output of said oscillator and a pulse oscillator is connected to a second input of said modulator to apply a pulse to said modulator at a frequency and amplitude lower than the frequency and amplitude of the signal from said transmit oscillator.

8. A radar beam control system for a phased array antenna having like groups of radiating elements lying in each of four quadrants and wherein a transmit oscillator generates a signal to be applied to and transmitted from each of said elements, the combination which comprises:
   (a) first and second phase modulators for connecting the output of said transmit oscillator to channels leading to first and third quadrants of said antenna,
   (b) third and fourth phase modulators for connecting the output of said transmit oscillator to signal channels leading to the second and fourth quadrants of said antenna, and
   (c) a pulse oscillator connected to each of the four modulators for modifying the signal of said oscillator thereby modifying by quadrants the phase of the signal transmitted from each element of said antenna during each transmitted pulse to produce a conical scan during said pulse by the beam from said array.

9. The method of controlling the radar beam from an antenna having a like plurality of radiating elements in different antenna sections comprising:
   generating a transmit signal having a given phase angle for each element of said antenna, and
   modifying through plural cycles by like amounts and during each said transmit signal the phase angles of the signals for all elements in a given section of said antenna.

10. The method of controlling a radar beam as set forth in claim 9 including generating four signals of predetermined phase for modifying by sections the phase of the signal transmitted from each element of said antenna to drive the antenna beam in a conical path of plural cycles during each transmit signal.

References Cited

UNITED STATES PATENTS

| | | | |
|---|---|---|---|
| 2,953,783 | 9/1960 | Schneider | 343—16 X |
| 3,032,759 | 5/1962 | Ashby | 343—16 |
| 3,202,991 | 8/1965 | Howells | 343—100 |
| 3,238,527 | 3/1966 | Vogt | 343—100 |
| 3,319,249 | 5/1967 | Blachier et al. | 343—100 |

RODNEY D. BENNETT, Jr., Primary Examiner

JEFFREY P. MORRIS, Assistant Examiner